United States Patent [19]

Ziegenhain

[11] Patent Number: 4,954,330

[45] Date of Patent: Sep. 4, 1990

[54] PROCESS FOR PURIFYING HYDROGEN FLUORIDE

[75] Inventor: William C. Ziegenhain, Ponca City, Okla.

[73] Assignee: E. I. DuPont de Nemours and Company, Wilmington, Del.

[21] Appl. No.: 443,373

[22] Filed: Nov. 30, 1989

[51] Int. Cl.$^5$ .................... C01B 7/19; C01G 28/00; B01D 3/34

[52] U.S. Cl. .................... 423/484; 203/31; 210/911; 210/758

[58] Field of Search ............ 423/484, 488; 203/31; 210/758, 721, 902, 911

[56] References Cited

U.S. PATENT DOCUMENTS

| | | | |
|---|---|---|---|
| 2,777,754 | 1/1957 | Weinmayr | 423/484 |
| 3,166,379 | 1/1965 | Bradley et al. | 423/484 |
| 3,663,382 | 5/1972 | Garris | 203/91 |
| 3,687,622 | 8/1972 | Garris | 423/486 |
| 3,689,370 | 9/1972 | Osaka et al. | 203/31 |
| 4,032,621 | 6/1977 | Meadows | 423/488 |
| 4,083,941 | 4/1978 | Jayawant et al. | 423/488 |
| 4,491,570 | 1/1985 | Wheaton et al. | 423/484 |
| 4,668,497 | 5/1987 | Miki | 423/484 |
| 4,756,899 | 7/1988 | Jenczewski et al. | 423/483 |

FOREIGN PATENT DOCUMENTS

| | | | |
|---|---|---|---|
| 62309 | 6/1968 | German Democratic Rep. | |
| 155736 | 5/1979 | Japan | 210/911 |
| 389691 | 4/1971 | U.S.S.R. | 210/911 |

OTHER PUBLICATIONS

Lehms et al., Chem. Abs. 109:76171W "Method for the Manufacture of High-Purity Hydrofluoric Acid".

*Primary Examiner*—Jeffrey E. Russel
*Assistant Examiner*—Brian M. Bolam
*Attorney, Agent, or Firm*—Robert B. Stevenson

[57] ABSTRACT

A process for preparing hydrogen fluoride involving treating anhydrous hydrogen fluoride containing primarily trivalent arsenic impurities with an effective amount of chromium (VI) oxide (i.e., $CrO_3$) and oxygen such as to oxidize substantially all of the trivalent arsenic to pentavalent arsenic (i.e., $As^{+3} \rightarrow As^{+5}$) followed by separation and recovery (e.g., by distillation) of purified anhydrous hydrogen fluoride.

8 Claims, No Drawings

PROCESS FOR PURIFYING HYDROGEN FLUORIDE

BACKGROUND OF THE INVENTION

1. Field of the Invention:

This invention relates to a process for purifying hydrogen fluoride (HF). More specifically but not by way of limitation, the invention relates to the removal of trivalent arsenic ($As^{+3}$) impurities from anhydrous HF by oxidation of $As^{+3}$ to the pentavalent arsenic ($As^{+5}$) using hexavalent chromium oxide ($CrO_3$) and oxygen followed by distillation of the HF.

2. Description of the Prior Art:

Anhydrous hydrogen fluoride is formed by heating a mixture of fluorspar and sulfuric acid. The main impurities in the prepared hydrogen fluoride are flurosulfonic acid, silicon tetrafluoride, sulfur dioxide, sulfuric acid and water. These impurities are usually removed by fractional distillation, and the resulting anhydrous hydrogen fluoride has a purity of about 99.8% or better. However, the anhydrous hydrogen fluoride thus obtained still contains unacceptable quantities of undesirable impurities such as arsenic. The amount of arsenic impurity which is present in the anhydrous hydrogen fluoride depends on the amount of arsenic-bearing impurities in the fluorspar used to prepare the anhydrous hydrogen fluoride.

The anhydrous hydrogen fluoride generally contains about 20 to 600 part per million (ppm) of arsenic impurity but can be as high as 1500 ppm, again dependent upon the particular source of fluorspar. The presence of this impurity at these levels is undesirable for many applications.

The degree of purity of anhydrous hydrogen fluoride required is to a great extent dependent on the particular end use application. Thus it is generally known that for such applications as found in the electronics industry such as cleaning agents and etchants in the production of semiconductors, diodes and transistors, a high degree or purity and extremely low levels of impurities are required. Typically arsenic concentrations in terms of a few parts per billion are desirable. Thus the prior art discloses several anhydrous hydrogen fluoride purification processes intended to reduce the arsenic concentration to levels measured in terms of parts per billion. However, these known processes are characterized as involving a combination of costly reagents, equipment and/or procedure as well as frequently requiring prolonged periods of time.

For example, U.S. Pat. No. 3,166,379 discloses a method whereby high purity aqueous hydrogen fluoride is produced by treatment with an oxidizing agent, such as permanganate salts, in combination with a halogen, preferably iodine, to convert arsenic impurities to non-volatile compounds. This process is suitable for the purification of aqueous hydrogen fluoride but suffers from the drawback of contamination with volatile manganese compounds when anhydrous hydrogen fluoride is distilled from the aqueous solution.

A solution to this problem is claimed in U.S. Pat. No. 3,689,370 which describes a process involving the addition of an inorganic ferrous salt to the anhydrous hydrogen fluoride after the permanganate or dichromate treatment to reduce excess oxidizing agents. However, this process results in a high level of iron contamination.

The iron contamination problem is solved in U.S. Pat. No. 4,032,621 which describes a process involving the addition of a heavy-metal-free reagent, such as hydrogen peroxide, to anhydrous hydrogen fluoride after the permanganate or dichromate treatment to reduce excess oxidizing agent. This process is very sensitive and may not be convenient for continuous operation.

In U.S. Pat. No. 3,687,622 the distillation of impure anhydrous hydrogen fluoride containing 1200 ppm As at very high pressures (e.g., >115 psia and preferably >165 psia) is disclosed wherein the As is removed overhead, and purified hydrogen fluoride (e.g., <3,000 ppb and preferably <100 ppb As) is recovered as bottoms product. In U.S. Pat. No. 3,663,382 As impurities are removed from anhydrous hydrogen fluoride by distillation at a pressure below 25 psia, with purified hydroqen fluoride being recovered as the overhead product.

In East German Patent No. 62,309 (June 20, 1968) the removal of arsenic from 80-90% aqueous hydrogen fluoride with 30% hydrogen peroxide ($H_2O_2$) at 40°-60° C. is disclosed. The reference also teaches that arsenic removal from anhydrous hydrogen fluoride can be accomplished by continuously adding anhydrous hydrogen fluoride and hydrogen peroxide solution of suitable concentration to the reactor maintained at 80-90% hydrogen fluoride and 40°-60° C. The reactor contents are distilled and absorbed in water to produce a purified aqueous solution of HF. This process is limited to production of aqueous solutions of HF product and is not suitable for the manufacture of purified anhydrous hydrogen fluoride.

U.S. Pat. No. 4,083,941 claims removal of arsenic and sulfite impurities from anhydrous hydrogen fluoride by the addition of 0.7% $H_2O_2$ and 0.6% methanol at 0°-75° C. or by the addition of at least 2.3% by weight of persulfuric acid ($H_2SO_5$) based on anhydrous hydrogen fluoride.

U.S. Pat. No. 4,491,570 claims arsenic removal from anhydrous hydrogen fluoride by treating with elemental chlorine and anhydrous hydrogen chloride or a fluoride salt, or both, and then separating purified anhydrous hydrogen fluoride by distillation from the non-volatile arsenic compounds. In U.S. Pat. No. 4,667,497 a process involving the addition of elemental fluorine to oxidize impurities present in hydrogen fluoride, followed by distillation, is disclosed.

U.S. Pat. No. 4,756,899 claims arsenic removal from anhydrous hydrogen fluoride by treating with hydrogen peroxide in the presence of a catalyst, which is comprised of molybdenum or an inorganic molybdenum compound, and a phosphate compound followed by distillation.

In contrast to the known ultra high purity processes of the prior art, technical or industrial grade anhydrous hydrogen fluoride containing typically from about 50 to 100 parts per million arsenic can usually be used in chemical processing or in the oil refining industry without too much difficulty. However, when the arsenic impurity level is higher, catalyst deactivation is usually accelerated and at very high arsenic levels (e.g., from about 200 ppm to about 1500 ppm) corrosion of processing equipment also becomes very severe. For example, in the process of fluorinating chlorocarbons with hydrogen fluoride in the presence of antimony halide catalysts to produce fluorinated hydrocarbons, arsenic in hydrogen fluoride will accumulate in the antimony halide catalysts thus contributing to the accelerated deactivation of the catalysts. When the deactivated catalyst is reactivated or discarded, the presence of large amounts of arsenic in the spent antimony halide catalyst presents handling problems. The presence of large amounts of arsenic in the processing system can lead to greatly accelerated corrosion of process equipment if an oxidant, such as chlorine, is also present.

In the commercial manufacturing of anhydrous hydrogen fluoride the technical grade hydrogen fluoride is purified by one or more final distillation steps. This conventional fractional distillation is effective in removing most of the major impurities except for the arsenic impurities. Usual distillation procedures are ineffective in significantly reducing the arsenic level in anhydrous hydrogen fluoride since arsenic is present in the trivalent ($As^{+3}$) form as arsenic trifluoride which will codistill with hydrogen fluoride. Consequently there exists a need for a process that inexpensively and effectively decreases the arsenic impurities in anhydrous hydrogen fluoride to a level of at least less than about 100 ppm and preferably below 30 ppm.

SUMMARY OF THE INVENTION

The present invention provides an inexpensive yet reliable process for the removal of arsenic impurities in anhydrous hydrogen fluoride to produce an acceptable industrial or technical grade anhydrous hydrogen fluoride. The process involves treating technical or industrial grade anhydrous hydrogen fluoride containing high levels of arsenic impurities with a small amount of chromium (VI) oxide, $CrO_3$, and gaseous oxygen. Anhydrous hydrogen fluoride containing sufficiently reduced levels of arsenic such as to be suitable for use in chemical and oil refining processes is then recovered by distillation.

Thus, the present invention provides a process for purifying hydrogen fluoride comprising the steps of:

(a) contacting anhydrous hydrogen fluoride containing trivalent arsenic impurities with an effective amount of hexavalent chromium oxide and oxygen to oxidize substantially all of the trivalent arsenic to pentavalent arsenic; and (b) distilling the resulting mixture, thus recovering purified anhydrous hydrogen fluoride having reduced levels of impurities.

In one embodiment of the invention the arsenic impurities are oxidized at a temperature from about $-20°$ C. to about $100°$ C. in the presence of about one gram of $CrO_3$ per 100 grams of liquid phase anhydrous hydrogen fluoride and in the presence of about 1.3 to 10 moles of oxygen per mole of arsenic impurity.

It is an object of the present invention to provide a process for purifying anhydrous hydrogen fluoride having lower levels of arsenic impurities. It is a further object of the present invention to provide a process for purifying anhydrous fluoride which is economical, rapid and effective. It is still a further object of the invention to provide a process for treating technical or industrial grade anhydrous hydrogen fluoride with $CrO_3$ in the presence of oxygen followed by distillation to provide anhydrous hydrogen fluoride containing less than about 100 ppm arsenic. Fulfillment of these objects and the presence and fulfillment of other objects will be apparent upon complete reading of the specification and attached claims.

DESCRIPTION OF THE PREFERRED EMBODIMENT

The method of reducing the arsenic level in hydrogen fluoride according to the present invention is related primarily to the purification of technical or industrial grade anhydrous hydrogen fluoride, although the process is broadly applicable to any anhydrous hydrogen fluoride. For purposes of this invention, reference to technical or industrial grade anhydrous hydrogen fluoride means any commodity consisting of at least 95% by weight hydrogen fluoride (i.e., less than 5 weight % water) and preferably 99% by weight hydrogen fluoride. Typically, this will involve a product which is usually prepared by heating together a mixture of fluorspar and sulfuric acid which is then to be followed by fractional distillation. The purity of industrial grade anhydrous hydrogen fluoride derived from the above described method will depend upon the source of the fluorspar. Technical or industrial grade anhydrous hydrogen fluoride will contain various levels of impurities such as water as well as compounds of silicon, sulfur, bismuth, phosphorus and arsenic. Most of these impurities, except for arsenic, are readily removed by distillation. Thus, arsenic may be present in the distillate at levels of from about 50 ppm to about 1500 ppm, again depending upon the particular source of fluorspar.

In contrast to the previously described ultra-pure (i.e., impurity levels of a few ppb) anhydrous hydrogen fluoride required in electronic applications, technical or industrial grade anhydrous hydrogen fluoride containing, for example, from about 50 to 100 ppm arsenic impurities, can usually be used in chemical processing or oil refining industries without too much difficulty. However, when the arsenic impurity level is higher, catalyst deactivation (e.g., the antimony halide catalysts used in fluorinating chlorocarbons) is accelerated, and at very high arsenic levels (e.g., 200 to 1500 ppm) corrosion of processing equipment can be severe if an oxidant, such as chlorine, is also present.

The method of reducing the arsenic level in technical or industrial grade anhydrous hydrogen fluoride according to the present invention represents a very simple, economical, rapid and effective treatment of anhydrous hydrogen fluoride containing high levels of $As^{+3}$ to provide anhydrous hydrogen fluoride suitable for use in the chemical and oil refining processes. This process comprises treating anhydrous fluoride containing high levels of $As^{+3}$ impurities with hexavalent chromium oxide (i.e., chromium (VI) oxide, $CrO_3$) and gaseous oxygen such as to oxidize trivalent arsenic ($As^{+3}$) to pentavalent arsenic ($As^{+5}$). The trivalent arsenic impurities present on the anhydrous hydrogen fluoride will, prior to oxidation to the pentavalent state, codistill with the HF and as such is not readily removed. In contrast and after oxidation, the pentavalent arsenic impurities in the anhydrous hydrogen fluoride, will be in the form of $AsF_5$ which is readily separated by distillation. Thus, according to the present invention the soluble and distillable $As^{+3}$ (as $AsF_3$) in anhydrous hydrogen fluoride is converted to the insoluble and non-distillable $AsF_5$ by virtue of contact with hexavalent chromium (VI) oxide; i.e., contact with $CrO_3$, and sufficient molecular oxygen to oxidize substantially all $As^{+3}$ to $As^{+5}$.

The amount of chromium (VI) oxide to be employed in the present invention is preferably in excess of 0.1 percent by weight of the anhydrous hydrogen fluoride being purified. Preferably, the amount of chromium (VI) oxide employed should be about one percent by weight of the hydrogen fluoride present. The amount of oxygen employed should be at least a stoichiometric amount relative to the desired oxidation of $As^{+3}$ to $As^{+5}$ and preferably a stoichiometric excess, typically from about 1.3 to about 10 moles of oxygen per mole of arsenic. The oxygen can be present in the form of air, pure oxygen, or a mixture of the two.

The process according to the present invention can be carried out at any convenient temperature. Temperatures in the range of from about $-20°$ C. to about $100°$ C. are useful. Since hydrogen fluoride boils at about $20°$ C., any treatment above the boiling point of hydrogen fluoride should be in a closed pressurized system to ensure the presence of a liquid phase. The preferred temperature for the treatment is from about $5°$ C. to about $80°$ C. Generally, contact times of from about 1 minute to about 3 hours are sufficient, with shorter times for higher temperatures.

The apparatus and equipment employed in the process according to the present invention can be any such equipment as generally known in the art as being acceptable for use with anhydrous hydrogen fluoride. Thus all surfaces of the distillation vessel, column, column packing, condenser and receiver which come into contact with hydrogen fluoride must be inert towards it. Suitable materials of construction are metals such as low carbon steel, nickel and nickel alloys such as "INCONEL", "HASTALLOY" Alloys B, C and D, "CARPENTER" 20, "DURIMET" 20 and platinum. Of these, low carbon steel is preferred from the standpoint of economy. Stainless steels are generally not suitable due to the possibility of trace contamination from alloy constituents. Polymeric materials such as polyethylene, unplasticized polyvinyl chloride and fluorocarbon polymers such as "TEFLON" can also be used, and of these "TEFLON" or similar fluorocarbon polymers are preferred.

The following examples are presented to further illustrate a specific embodiment of the invention using a chromium (VI) oxide catalyst and a comparison to runs without the catalyst being present. In these examples all references to parts and percentages are by weight unless otherwise indicated.

EXAMPLE I

One gram of analytical reagent grade chromium trioxide ($CrO_3$) crystals was added to a high pressure "TEFLON"-lined 250 ml autoclave. The autoclave was then evacuated to remove all air and cooled to $2°$ to $10°$ C. A total of 110 grams of commercial anhydrous hydrogen fluoride, containing 436 ppm of volatile arsenic, was then charged to the autoclave. The autoclave and the contents were cooled until the internal pressure reached 0 psig. Oxygen was then added to the autoclave until the pressure rose from 0 psig to 10 psig. The system was then sealed and heated to $70°$ C. for four hours. At the end of this period the system was cooled, and a vapor sample was taken. The arsenic in the vapor sample was 3.7 ppm (total As), amounting to a 99% reduction.

EXAMPLE II

In a manner analogous to Example I and using the same 250 ml autoclave, two additional runs were performed involving 100 and 104 grams of commercial anhydrous hydrogen fluoride containing 441 and 382 ppm volatile arsenic, respectively. In one run of four hours at $70°$ C. using a 50/50 mixture of air and oxygen without the $CrO_3$ catalyst a 44% reduction in the total arsenic present in the distillate was achieved. In the other run of four hours at $80°$ C. using 10 psig pure oxygen only an 18% reduction of the arsenic in the distillate was observed.

Having thus described and exemplified the invention with a certain degree of particularity, it should be appreciated that the following claims are not to be so limited but are to be afforded a scope commensurate with the wording of each element of the claim and equivalents thereof.

I claim:

1. A process for purifying anhydrous hydrogen fluoride comprising the steps of:
   (a) contacting anhydrous hydrogen fluoride containing trivalent arsenic impurities with an effective amount of hexavalent chromium oxide and oxygen to oxidize substantially all of said trivalent arsenic to pentavalent arsenic; and
   (b) distilling the resulting mixture, thus recovering anhydrous hydrogen fluoride with reduced levels of impurities.

2. The process of claim 1 wherein the temperature is from about $-20°$ C. to about $100°$ C.

3. The process of claim 1 wherein for every 100 grams of anhydrous hydrogen fluoride there is present at least about one gram of hexavalent chromium oxide.

4. The process of claim 2 wherein for every 100 grams of anhydrous hydrogen fluoride there is present at least about one gram of hexavalent chromium oxide.

5. The process of claim 1 wherein for every mole of trivalent arsenic to be converted to pentavalent arsenic there there is from about 1.3 to about 10 moles of oxygen.

6. The process of claim 2 wherein for every mole of trivalent arsenic to be converted to pentavalent arsenic there there is from about 1.3 to about 10 moles of oxygen.

7. The process of claim 3 wherein for every mole of trivalent arsenic to be converted to pentavalent arsenic there there is from about 1.3 to about 10 moles of oxygen.

8. The process of claim 4 wherein for every mole of trivalent arsenic to be converted to pentavalent arsenic there there is from about 1.3 to about 10 moles of oxygen.

* * * * *